(12) United States Patent
Yang et al.

(10) Patent No.: US 6,454,894 B1
(45) Date of Patent: Sep. 24, 2002

(54) METHOD OF MANUFACTURING OPTICAL FIBER RIBBONS

(75) Inventors: Michael Yang, NE Conover; Patrick Bourghelle, Hickory, both of NC (US)

(73) Assignee: Alcatel, Paris (FR)

( * ) Notice: Subject to any disclaimer, the term of this patent is extended or adjusted under 35 U.S.C. 154(b) by 312 days.

(21) Appl. No.: 09/116,338

(22) Filed: Jul. 16, 1998

(30) Foreign Application Priority Data

Jul. 17, 1997 (FR) .............................. 97 09066

(51) Int. Cl.⁷ .............................. G02B 6/04; B05D 5/06
(52) U.S. Cl. ..................... 156/180; 427/163.2
(58) Field of Search ................ 427/163.2; 156/180

(56) References Cited

U.S. PATENT DOCUMENTS

| | | | | |
|---|---|---|---|---|
| 4,720,165 A | * | 1/1988 | Tokuda et al. | 156/166 |
| 4,913,859 A | * | 4/1990 | Overton et al. | 264/1.27 |
| 5,037,763 A | * | 8/1991 | Petisce | 436/172 |
| 5,536,528 A | * | 7/1996 | Tanaka et al. | 427/163.2 |
| 5,763,003 A | * | 6/1998 | Bonicel et al. | 427/163.2 |

FOREIGN PATENT DOCUMENTS

WO    WO 9218892    10/1992

* cited by examiner

*Primary Examiner*—Shrive P. Beck
*Assistant Examiner*—Michael Cleveland
(74) *Attorney, Agent, or Firm*—Sughrue Mion, PLLC

(57) ABSTRACT

A method of manufacturing optical ribbons, wherein the optical fibers are paid out by an optical fiber pay-out unit, and grouped together in a nozzle where they are coated in a coating material which is caused to set in order to form an optical fiber ribbon. A plurality of groups of optical fibers are formed in parallel in as many nozzles as possible, and the groups of optical fibers, which are coated in a coating material, are caused to set simultaneously using a single setting means for setting the coating material, in order to form as many ribbons of optical fibers as possible, thereby enabling the manufacturing cost of a ribbon to be reduced.

8 Claims, 4 Drawing Sheets

FIG_1
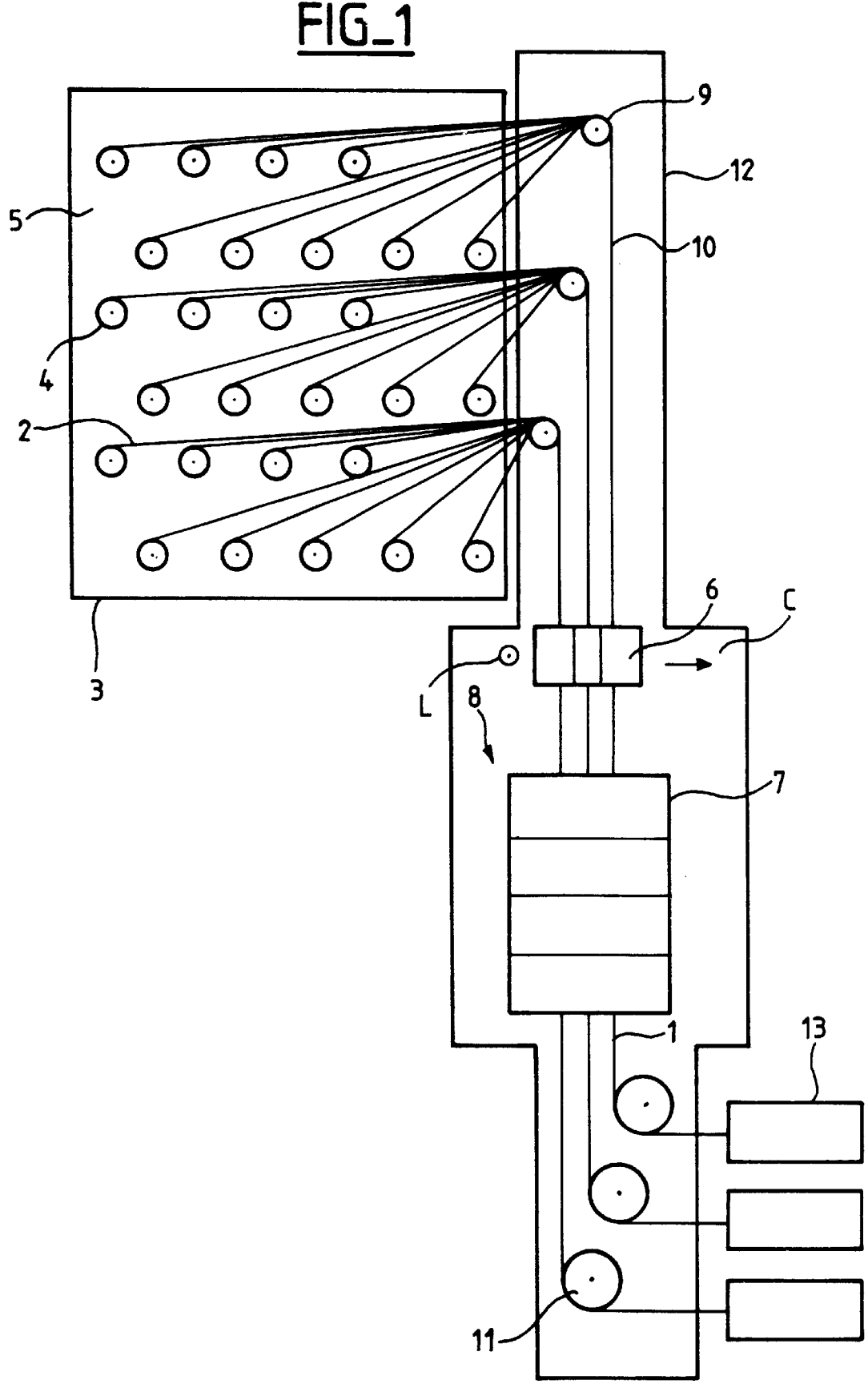

FIG_2
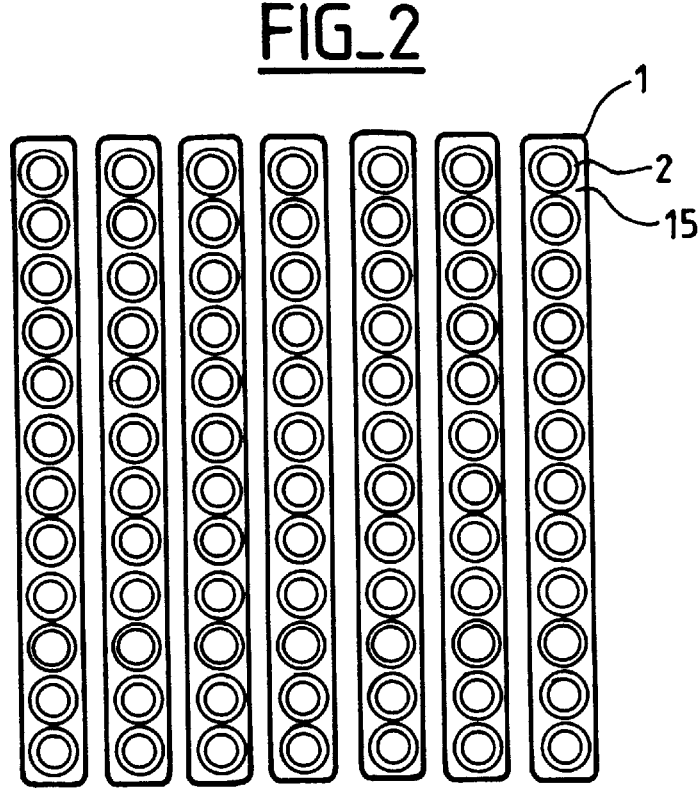
FIG_3
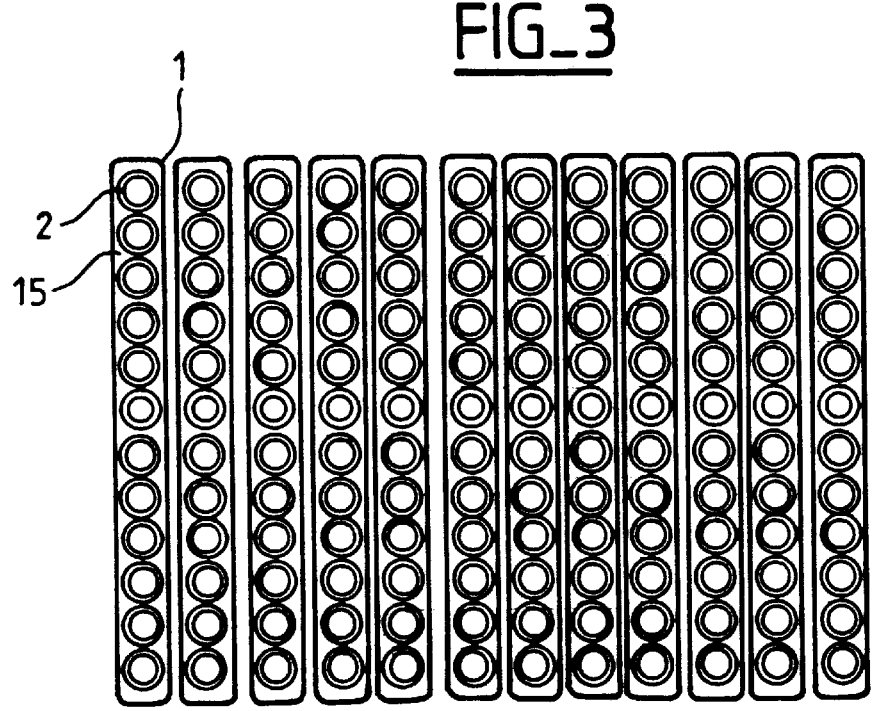

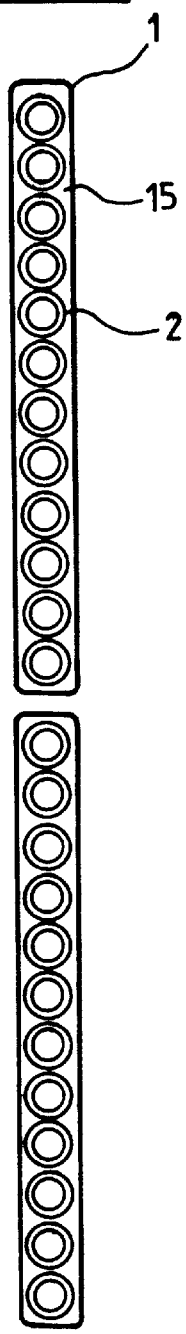
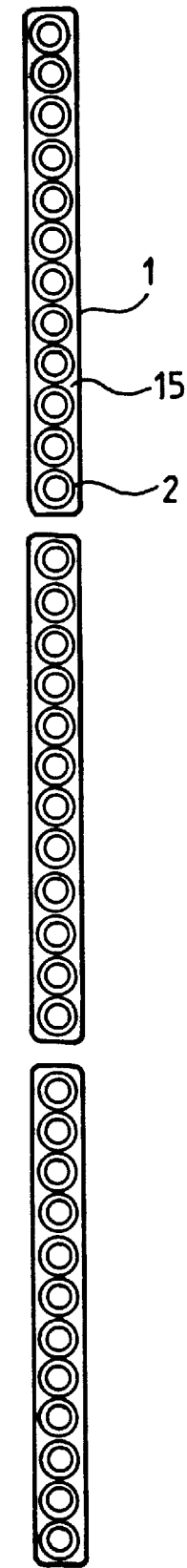

FIG_6
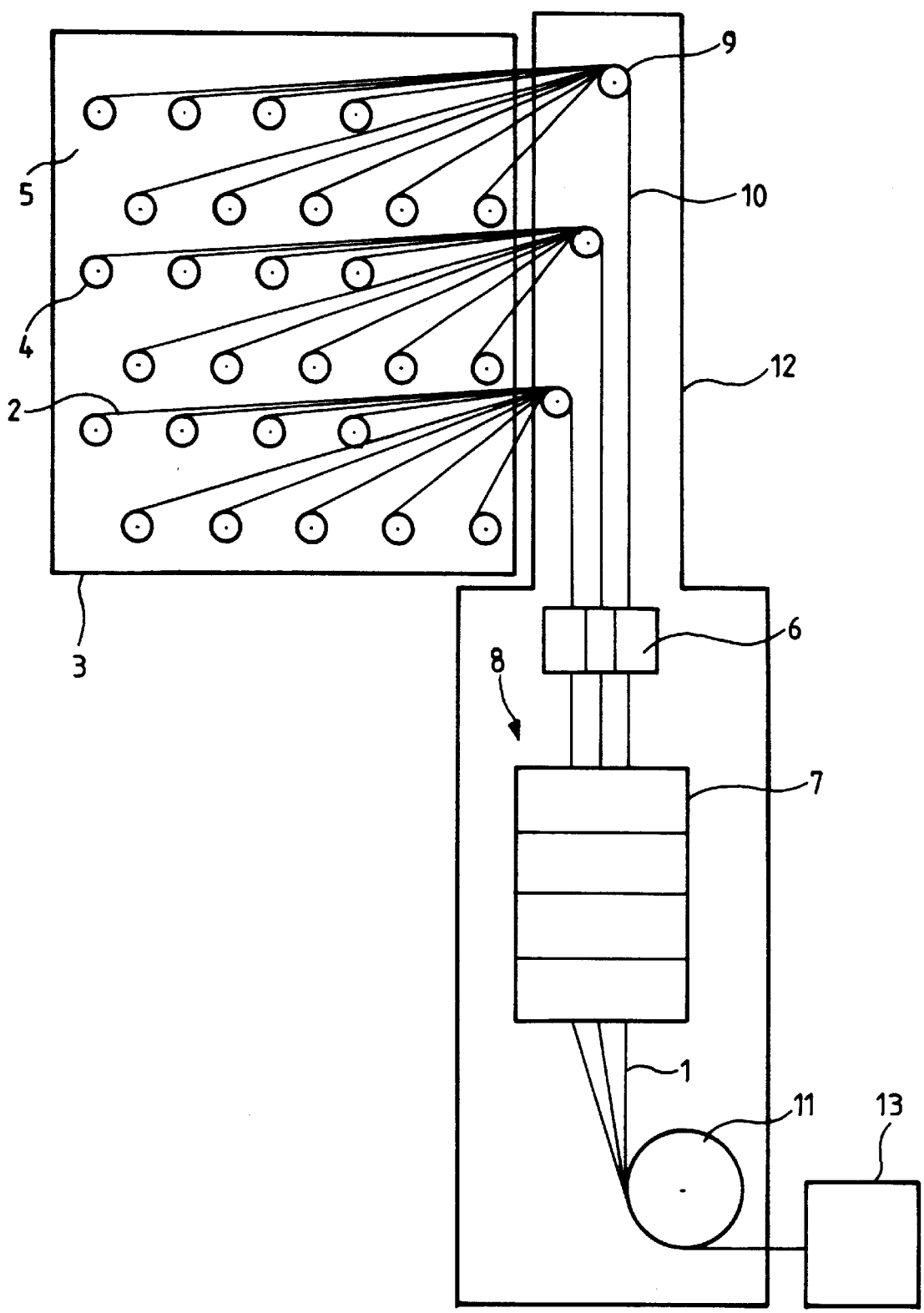

METHOD OF MANUFACTURING OPTICAL FIBER RIBBONS

The invention relates to a method of manufacturing optical fiber ribbons, in which optical fibers are paid out by an optical fiber pay-out unit, and they are grouped together in a nozzle where they are coated in a coating material which is caused to set in order to form an optical fiber ribbon.

BACKGROUND OF THE INVENTION

In known manner, with such a manufacturing method, where a single ribbon is manufactured, the optical fibers are paid out by reels rotatably mounted on a feed unit. They are then guided by a pulley, and grouped together parallel to one another in a nozzle, the nozzle itself being fed with a coating material which is deposited around the fibers, thereby forming a continuous layer. The coated fibers then travel through a chamber designed to cause the coating material to set and thus form a ribbon which is taken up on a take-up unit by means of a capstan.

The ribbons are used in cables which present many advantages over cables having independent or braided optical fibers, among which should be mentioned: a higher density of optical fibers; and connection operations facilitated by the fibers being in an organized disposition relative to one another.

Increasing production capacity for this type of cable is an important industrial objective. Economically, it might appear advantageous to increase the travel speed of the optical fibers during manufacture. However, the mechanical inertia of the reels, of the pulley which guides the optical fibers, and of the capstan, together with the vibrations of the optical fibers along the length of their path, put a limit on how far speed can be increased. The solution consisting in multiplying the number of installations performing the method in parallel, in order to manufacture a plurality of ribbons, is technically possible, but it presents numerous economic drawbacks, including high investment cost, and large floor space requirements.

SUMMARY OF THE INVENTION

The object of the invention is to provide a method of simultaneously manufacturing a plurality of ribbons of optical fiber in parallel, at a manufacturing cost per ribbon that is less than that which would result from merely multiplying the number of manufacturing installations.

To this end, the invention provides a method of manufacturing optical fiber ribbons, in which optical fibers are paid out by an optical fiber pay-out unit, and they are grouped together in a nozzle where they are coated in a coating material which is caused to set in order to form an optical fiber ribbon, wherein a plurality of groups of optical fibers are formed in parallel in as many nozzles, and wherein the groups of optical fibers, which are coated in a coating material, are caused to set simultaneously using a single setting means for setting the coating material, in order to form as many optical fiber ribbons.

The energy required to set the coating material is delivered simultaneously to the ribbons being manufactured in parallel. Since the setting step is the most costly step of the manufacturing method, the method of the invention allows the energy cost per ribbon to be minimized.

The floor space required is not significantly greater than that required for a single-ribbon method, insofar as the same setting means is used in common for manufacturing the ribbons.

BRIEF DESCRIPTION OF THE DRAWINGS

Other characteristics and advantages of the invention appear on reading the description as illustrated by the drawings:

FIG. 1 is a front view of a device implementing the manufacturing method of the invention;

FIG. 2 is a cross-section view of seven ribbons, manufactured simultaneously in a column arrangement, and each including twelve optical fibers;

FIG. 3 is a cross-section view of twelve ribbons, manufactured simultaneously in a column arrangement, and each including twelve optical fibers;

FIG. 4 is a cross-section view of two ribbons, manufactured simultaneously in a row arrangement, and each including twelve optical fibers;

FIG. 5 is a cross-section view of three ribbons, manufactured simultaneously in a row arrangement, and each including twelve optical fibers; and FIG. 6 is a front view of a device implementing the method of the invention in which the ribbons are taken up by a single take-up unit.

DETAILED DESCRIPTION OF THE PREFERRED EMBODIMENT

The method of the invention comprises a first step during which optical fibers are paid out by an optical fiber pay-out unit, and grouped together in a nozzle where they are coated in a coating material which is caused to set in order to form an optical fiber ribbon.

In the following description, the terms "upstream" and "downstream", or "inlet" and "outlet", are relative to the travel direction of the starting optical fibers towards the ribbons. When the same element appears in several figures, it retains the same reference.

In FIG. 1, twenty-seven optical fibers 2 are paid out by twenty-seven pay-out reels 4 rotatably mounted on a feed unit 3. The optical fibers are guided by three pulleys 9 fixed at the inlet to a coating tower 12, and are grouped together in three groups 10 each including nine fibers. The three pulleys 9 are spaced sufficiently far apart from one another so as not to hamper the grouping together of the optical fibers.

The feed unit 3, shown in FIG. 1, possesses a single support surface 5. In a variant, the unit presents a plurality of support surfaces to facilitate pay out of the optical fibers from the reels 4.

In a particular embodiment, the method of the invention comprises a step of coloring the optical fibers by means of a color unit inserted between the feed unit 3 and the coating tower 12, to enable each fiber to be identified by a color code.

The three groups of nine optical fibers are then guided through three respective nozzles 6 disposed downstream of the three pulleys 9 in the coating tower 12. Each nozzle 6, known per se, comprises orifices, e.g. frustoconical orifices, tapering in the travel direction of the optical fibers. The three nozzles are disposed parallel to one another in a column arrangement, as shown by arrow C. An arrangement of the three nozzles in a line perpendicular to the plane of FIG. 1, and shown by the direction L, is also possible. A duct connects each orifice to a tank of coating material. By way of example, the material is constituted by a resin having acrylic functional groups, the resin containing about 10% by weight of initiators which are sensitive to ultraviolet rays.

The resin is set as a result of a cross-linking reaction, for which a cross-linking rate is defined by the number of acrylic functional groups that react relative to the initial number of groups. In a variant of the invention, the coating material is a thermosetting resin.

The material deposited around each optical fiber coalesces with the material deposited on adjacent fibers to form a continuous layer surrounding all of the optical fibers that are to form the corresponding ribbon.

During a second step of the method of the invention, a plurality of groups of optical fibers are formed in parallel in as many nozzles, and the groups of optical fibers, which are coated in coating material, are caused to set simultaneously using a single setting means for setting the coating material, in order to form as many optical fiber ribbons.

In FIG. 1, the three above-described groups 10 each of nine coated optical fibers pass simultaneously through a chamber 8 disposed downstream of the three nozzles 6, and including, in series, four lamps 7 emitting light in the ultraviolet region of the spectrum. By way of example, the first two lamps disposed at the inlet to the chamber 8 are of a known type H covering a spectrum lying in the range 200 nanometers (nm) to 300 nm, and enabling the surface of the layer of coating material deposited on the optical fibers to set. The last two lamps are of another known type D covering a spectrum lying in the range 300 nm to 450 nm, and enabling the layer of coating to set throughout its thickness. The four lamps have a power density per unit area of 120 watts per square centimeter ($W/cm^2$), and lead to a cross-linking rate per ribbon of 70% of the layer of resin having acrylic functional groups that is deposited on the optical fibers.

In H and D type lamps, the radiant energy is concentrated by an elliptical-shaped reflector into a substantially circular zone defined by a focal diameter. Various focal diameters are available depending on the reflectors used in the lamps. The method of the invention advantageously takes advantage of the various available focal diameters in order to provide the amount of energy that is necessary and sufficient to set the coating material, by choosing focal diameter as a function of the number of ribbons simultaneously passing through the setting chamber.

FIGS. 2 and 3 respectively show seven and twelve ribbons 1 disposed parallel with one another in a column arrangement corresponding to an identical arrangement of the seven and twelves nozzles from which they came. Each ribbon comprises twelve optical fibers 2 which are coated in a coating material 15, and are, in cross-section, of width equal to 3.10 millimeters (mm), and of thickness equal to 0.31 mm. The ribbons are caused to set simultaneously by a setting chamber as described above, and in which the lamps are used with reflectors having focal diameters equal to 6 mm and to 9 mm respectively.

FIGS. 4 and 5 respectively show two and three ribbons 1 disposed in a row arrangement corresponding to an identical arrangement of the two and of the three nozzles from which they came. Once again, the ribbons, which are of the same size as those in FIGS. 2 and 3, are caused to set simultaneously by a setting chamber in which the lamps are used with reflectors having focal diameters equal to 6 mm and to 9 mm respectively.

In a variant of the invention, the setting chamber comprises lamps whose light extends to the infrared region of the spectrum to cause a coating material constituted by a thermosetting resin to be set. In another variant, the setting chamber is connected to a source of electron beams.

In the method of the invention, the ribbons are guided by one or more capstans, and they are taken up by one or more take-up units.

At the outlet from the setting chamber 8, shown in FIG. 1, the three ribbons are individually guided by capstans 11, disposed at the outlet from the coating tower 12, and they are taken up by three take-up units 13. Each unit, known per se, comprises a motor which rotates a take-up reel which is dedicated to a single ribbon. The capstans enable the winding tension applied by the motor of each take-up reel to the ribbon and to the corresponding group of optical fibers to be individually adjusted. By way of example, the speed of rotation of the take-up reels corresponds to a ribbon manufacturing speed lying in the range 50 meters per minute (m/min) to 1000 m/min.

Advantageously, as shown in FIG. 6, all three ribbons are taken up by a single capstan 11 and a single take-up unit 13 which are common to all three ribbons, thereby enabling the manufacturing cost per ribbon of the method of the invention to be reduced.

What is claimed is:

1. A method of manufacturing optical fiber ribbons, comprising the steps of:

paying out a plurality of optical fibers using a plurality of optical fiber pay-out units, grouping said optical fibers together into individual parallel groups prior to entering into a nozzle, wherein a plurality of said groups of optical fibers are fed in parallel into as many nozzles, such that said groups have separate nozzles coating said groups of optical fibers in said nozzle with a coating material in order to form a plurality of ribbons of optical fibers, setting said groups of coated optical fibers simultaneously using a single setting means in order to form said optical fiber ribbons.

2. The method according to claim 1, wherein said coating material is a resin, and the optical fibers are coated in said resin which is caused to set by exposing said resin to ultraviolet rays.

3. The method according to claim 2, wherein said setting step is performed in a chamber having at least one ultraviolet lamp.

4. The method according to claim 1, wherein said coating material is a thermosetting resin, and the optical fibers are coated in said thermosetting resin.

5. The method according to claim 4, wherein said setting step is performed in a chamber connected to a source of electron beams.

6. The method according to claim 1, wherein said setting step is performed in a chamber having at least one lamp whose light extends from ultraviolet to infrared.

7. The method according to claim 1, wherein the ribbons are guided by at least one capstan, and said ribbons are taken up by at least one take-up unit.

8. The method according to claim 1, wherein the ribbons are issued by nozzles disposed in a row and column arrangement.

* * * * *